US006877208B2

(12) United States Patent
Shirakawa et al.

(10) Patent No.: US 6,877,208 B2
(45) Date of Patent: Apr. 12, 2005

(54) APPARATUS FOR CONNECTING A TERMINAL-CONNECTED WIRE TO A CONNECTOR

(75) Inventors: Junichi Shirakawa, Yokkaichi (JP); Tomomi Katsurayama, Yokkaichi (JP); Kazumitsu Fukada, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 10/720,569

(22) Filed: Nov. 24, 2003

(65) Prior Publication Data

US 2004/0103531 A1 Jun. 3, 2004

(30) Foreign Application Priority Data

Nov. 29, 2002 (JP) ...................................... 2002-348363

(51) Int. Cl.$^{7}$ ................................................ B23P 23/00

(52) U.S. Cl. .................... 29/564.2; 29/33 M; 29/564.6; 29/753

(58) Field of Search ............................ 29/33 M, 564.2, 29/564.4, 566.2, 753, 564.6

(56) References Cited

U.S. PATENT DOCUMENTS

| | | | | | |
|---|---|---|---|---|---|
| 4,247,980 | A | * | 2/1981 | Tominoi | 29/42 |
| 4,255,850 | A | * | 3/1981 | Tomino | 29/742 |
| 5,058,260 | A | * | 10/1991 | Gloe et al. | 29/564.4 |
| 5,109,602 | A | * | 5/1992 | Fukuda et al. | 29/845 |
| 5,666,718 | A | | 9/1997 | Onishi et al. | |
| 2002/0038717 | A1 | | 4/2002 | Aoyama et al. | |

FOREIGN PATENT DOCUMENTS

| | | |
|---|---|---|
| JP | 09-115642 | 5/1997 |

* cited by examiner

*Primary Examiner*—Carl J. Arbes
(74) *Attorney, Agent, or Firm*—Gerald E. Hespos; Anthony J. Casella

(57) ABSTRACT

A mixed wire conveying step is provided to supply a plurality of terminal-connected wires having different specifications to the same production line. A wire holding step is provided to hold a terminal of the supplied terminal-connected wire such that the terminal can be inserted at least by means of a terminal chuck. An inserter selecting step is provided to select a suitable one from a plurality of terminal inserters for inserting the terminal in an inserting step in accordance with the kind of the supplied terminal-connected wire. The inserting step is performed by the cooperation of the terminal inserter selected in the inserter selecting step and a terminal chuck. A wide range of inserting operations for inserting many kinds of terminal-connected wires TW can be performed by a single unit.

7 Claims, 15 Drawing Sheets

APPARATUS FOR CONNECTING A TERMINAL-CONNECTED WIRE TO A CONNECTOR

BACKGROUND OF THE INVENTION

1. Field of the Invention

This invention relates to a method for producing a wiring harness and an apparatus for connecting a terminal-connected wire.

2. Description of the Related Art

Generally, a process of connecting wires with connectors is necessary for production of a wiring harness. Many automatic inserting apparatuses for inserting terminal-connected wires having terminals at their ends beforehand into a connector housing of a connector have been proposed as specific apparatuses for this connecting process. Japanese Patent No. 3019737 (pages 2–3, FIG. 2) discloses such an apparatus.

Many of these apparatuses are provided with a terminal chuck for guiding the terminal of the terminal-connected wire and a wire chuck for holding an insulated part of the terminal-connected wire near the terminal chuck. The terminal positioned by the terminal chuck is caused to face a terminal accommodating chamber of the connector housing by the terminal chuck and is inserted by the wire chuck. In this way, the terminal is inserted into the connector housing to connect with terminal-connected wire with the connector housing.

However, in the case of a thin terminal-connected wire, there is a danger that the insulated wire is buckled during the inserting operation. Accordingly, there has been developed an apparatus for performing an inserting operation by directly driving the terminal (Japanese Unexamined Patent Publication No. H09-115642 (pages 1–4, FIGS. 1 to 4)).

These automatic apparatuses are adopted on a production line for automatically producing wiring harnesses (see Japanese Patent No. 3019737)

As a background of the present application, terminal-connected wires and terminals are widely known (Japanese Unexamined Patent Publication No. 2002-100242 (pages 3–7, FIGS. 5, 6, 17 and 18)).

Wiring harnesses required in recent years have a high necessity of simultaneously handling a fairly many kinds of terminal-connected wires. In order to meet such a requirement, it is necessary to conduct an automatic production using both crimping terminals having barrels crimped into connection with ends of insulated wires and insulation-displacement terminals having insulation-displacement blades bitten in insulated wires. However, up to now, there has been no automatic inserting apparatus capable of inserting both terminal-connected wires having crimping terminals connected therewith and terminal-connected wires having insulation-displacement terminals connected therewith into a connector housing. Thus, upon building an automatic production line for wiring harnesses, a module for inserting crimping terminals and a module for inserting insulation-displacement terminals need to be arranged in parallel, which increases the facility cost and makes a problem of incapability of increasing serviceability ratios of the respective modules unavoidable.

SUMMARY OF THE INVENTION

It is an object of the present invention to provide a method for producing a wiring harness and an apparatus for connecting a terminal-connected wire which are free from the problems residing in the prior art.

It is another object of the present invention to provide a method for producing a wiring harness and an apparatus for connecting a terminal-connected wire which can ensure insertion of many kinds of terminal-connected wires.

According to an aspect of the invention, a plurality of terminal-connected wires having different specifications are supplied along the same production line. The terminal of the supplied terminal-connected wire is held such that the terminal can be inserted into a cavity of a connector housing at least by a terminal chuck. A suitable terminal inserter is selected from a plurality of terminal inserters for inserting the terminal in accordance with the kind of the supplied terminal-connected wire. The terminal facing the cavity is inserted into the cavity by the selected terminal inserter in cooperation with the terminal chuck. In this way, a wiring harness is produced.

According to another aspect of the invention, an apparatus for connecting a terminal-connected wire, comprises: a terminal chuck including a pair of claws for holding a terminal of a terminal-connected wire; a terminal-push type inserter including a pushing member for directly pushing the terminal; a wire-holding type inserter including a pair of claws for holding the insulated wire of the terminal-connected wire; an inserter selector for selecting a suitable inserter from the inserters in conformity with the terminal-connected wire to be connected; and a driver for driving the inserter selected by the inserter selector to insert the terminal.

These and other objects, features and advantages of the present invention will become more apparent upon a reading of the following detailed description and accompanying drawings.

DETAILED DESCRIPTION OF THE PREFERRED EMBODIMENTS

Figure 1B:
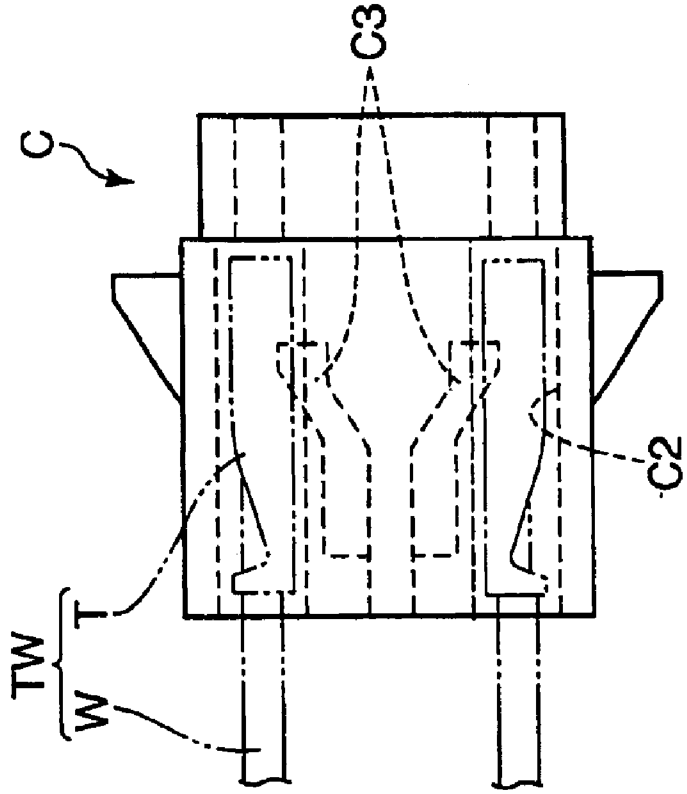
FIGS. 1A and 1B are a schematic front view and a schematic side view showing an outer configuration of a connector housing according to an embodiment of the invention.
Figure 1A:
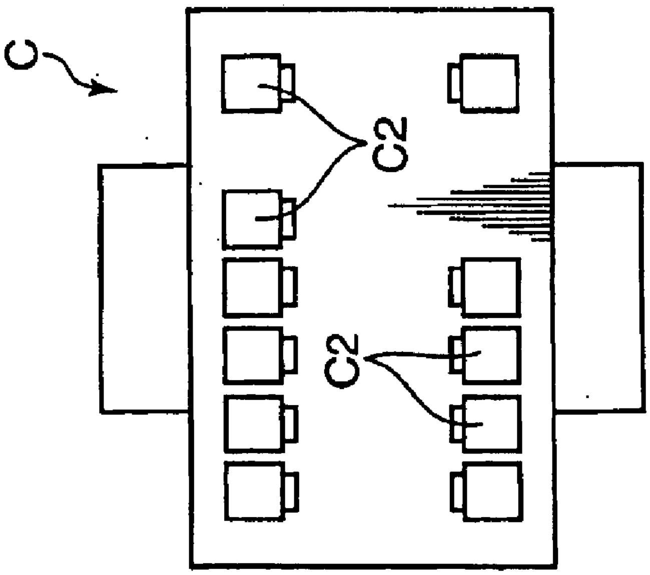

A preferred embodiment of the present invention is described in detail with reference to the accompanying drawings. With reference to FIGS. 1A and 1B, a connector housing C shown is formed with a plurality of cavities C2 asymmetrically arranged in the front surface of the connector housing C. The respective cavities C2 are arranged at two upper and lower stages in the front surface, and the phases of terminals T of terminal-connected wires TW are opposite at the upper and lower stages. A cantilever-shaped locking tongue C3 is formed in each cavity C2. Each locking tongue C3 is for locking the terminal T in the connector housing C by the engagement with a recess formed in the bottom surface of the terminal T by a known locking method. In the shown embodiment, the locking tongues C3 have free ends extending upward from the bottom of the cavities C2 at the lower stage while having free ends extending downward from the ceiling of the cavities C2 at the upper stage. In order to conform to such locking tongues C3, the phases of the terminals T about their longitudinal axes during the insertion are set such that the recesses thereof face the free ends of the corresponding locking tongues C3.

The terminal-connected wires TW are automatically produced by fixing the terminal T to an end of an insulated wire W by a production line for wiring harnesses to be described next.

In this embodiment, the terminal-connected wires TW are roughly classified into two specifications: one in which a crimping terminal is crimped into connection with a wire and the other in which an insulation-displacement terminal is connected with a wire. In each specification, many kinds of wires having different diameters are used.

A crimping terminal is a terminal having a barrel to be crimped into connection with an end of an insulated wire. An insulation-displacement terminal is a terminal having insulation-displacement blades to bite in an insulated wire. These crimping terminals and insulation-displacement terminals are not described here. For example, Japanese Unexamined Patent Publication No. 2002-100242 shows these terminals.

Figure 2:
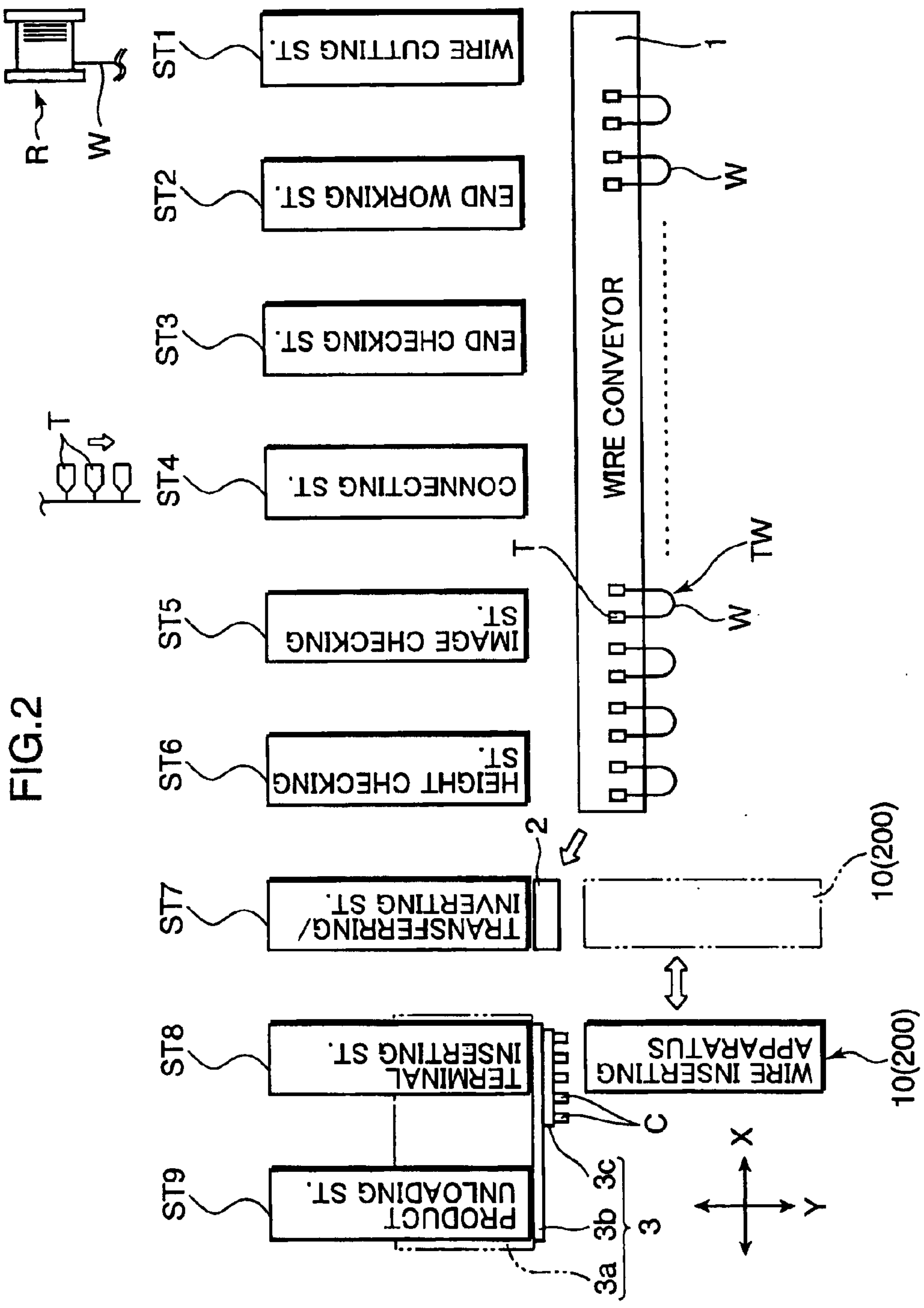
FIG. 2 is a layout diagram schematically showing a production line for wiring harnesses where the connector housing of FIG. 1 is worked.

FIG. 2 is a layout diagram schematically showing the production line for wiring harnesses where the connector housing C of FIG. 1 is worked.

With reference to FIG. 2, the production line of this embodiment includes a wire cutting station ST1 for dispensing the insulated wire W from a roll R and cutting it to a specified length, an end working station ST2 for working ends of the cut insulated wire W, an end checking station ST3 for checking the worked ends of the insulated wire W, an end connecting station ST4 for connecting the terminals T with the ends of the insulated wire W discriminated to be good after the check, an image checking station ST5 for checking the appearance of the connected terminals T, a height checking station ST6 for checking the heights of the terminals T after the image check, a transferring/inverting station ST7 for inverting the postures of the terminals T of the terminal-connected wire TW having passed the height check, a terminal inserting station ST8 for receiving the terminal-connected wire TW from the transferring/inverting station ST7 and inserting the terminal into the connector housing C, and a product unloading station ST9 for unloading an assembly of the terminal-connected wires TW assembled into a wiring harness by inserting the terminals T into the connector housings C.

In order to convey the insulated wires W cut to specified lengths in the wire cutting station ST1 to the downstream stations, a wire conveyor 1 is provided between the wire cutting station ST1 and the transferring/inverting station ST7. The wire conveyor 1 is so constructed as to convey the insulated wires W (i.e. terminal-connected wires TW) from the wire cutting station ST1 to the height checking station ST6 by causing an unillustrated wire clamp to intermittently reciprocate.

The wire conveyor 1 forms a conveyance path extending in a direction, along which the respective stations ST1 to ST9 are arranged side by side, and the insulated wires cut to specified lengths in the wire cutting station ST1 are held and successively conveyed from the station ST1 to the downstream ST2, ST3, . . . ST6 along this conveyance path by means of an unillustrated control mechanism.

The wire cutting station ST1 is provided with a measuring unit for measuring the insulated wire W to a preset length and a cutting unit for cutting the measured insulated wire W into a wire piece having ends cut at right angles.

The end working station ST2 is provided with a stripping unit for stripping an insulation coating of the insulated wire W to be connected with the crimping terminal. This station ST2 is exclusively designed to work the insulated wires W to be connected with the crimping terminals. The wire conveyor 1 is set such that the insulated wires W to be connected with the insulation-displacement terminals bypass the station ST2.

The end checking station ST3 is provided with an image sensing unit for sensing end portions of the insulated wire W. Whether or not the end portions of the insulated wire W are good is judged in this image sensing unit. In the case that the end portions of the insulated wire W are to be connected with the insulation-displacement terminals, the image sensing unit discriminates the outer diameter of the insulated wire W cut in the wire cutting station ST1. On the other hand, in the case that the end portions of the insulated wire W are to be connected with the crimping terminals, the image sensing unit checks a stripped state (length of an exposed section of a core and loosening of strands) of the insulated wire W worked in station ST2.

The connecting station ST4 is provided with a plurality of kinds of terminal connecting apparatuses corresponding to the specifications of the terminal-connected wires TW to be worked and arranged along a wire conveying direction of the wire conveyor 1. In this station ST4, the crimping terminals or the insulation-displacement terminals set for each insulated wire W are connected. Accordingly, the terminal-connected wires TW connected with the insulation-displacement terminals and those connected with the crimping terminals are mixedly present on the wire conveyor 1 after the connection in this connecting station ST4.

The image checking station ST5 is provided with an image sensing unit for checking the crimping terminals and the one for checking the insulation-displacement terminals, so that a connected state of every terminal can be checked by an image.

The height checking station ST6 is provided with a height measuring unit for checking whether or not the height of the wire barrel after crimping is good for the crimping terminals and checking the height after insulation displacement or the vinyl height.

The transferring/inverting station ST7 is provided with a transferring unit 2 and an inverting unit (not shown). The terminal-connected wire TW conveyed to an upstream end by the wire conveyor 1 is received by the transferring unit 2, and the phase of the terminal T with respect to the insulated wire W about a longitudinal axis is changed by 180° by the inverting unit.

The terminal inserting station ST8 is provided with a connector housing feeding unit 3 for holding a plurality of connector housings C and feeding them such that the terminals can be inserted thereinto, and a wire connecting apparatus 10 for inserting the terminal T of the terminal-connected wire TW into the connector housing C held in the connector housing feeding unit 3.

Figure 3:
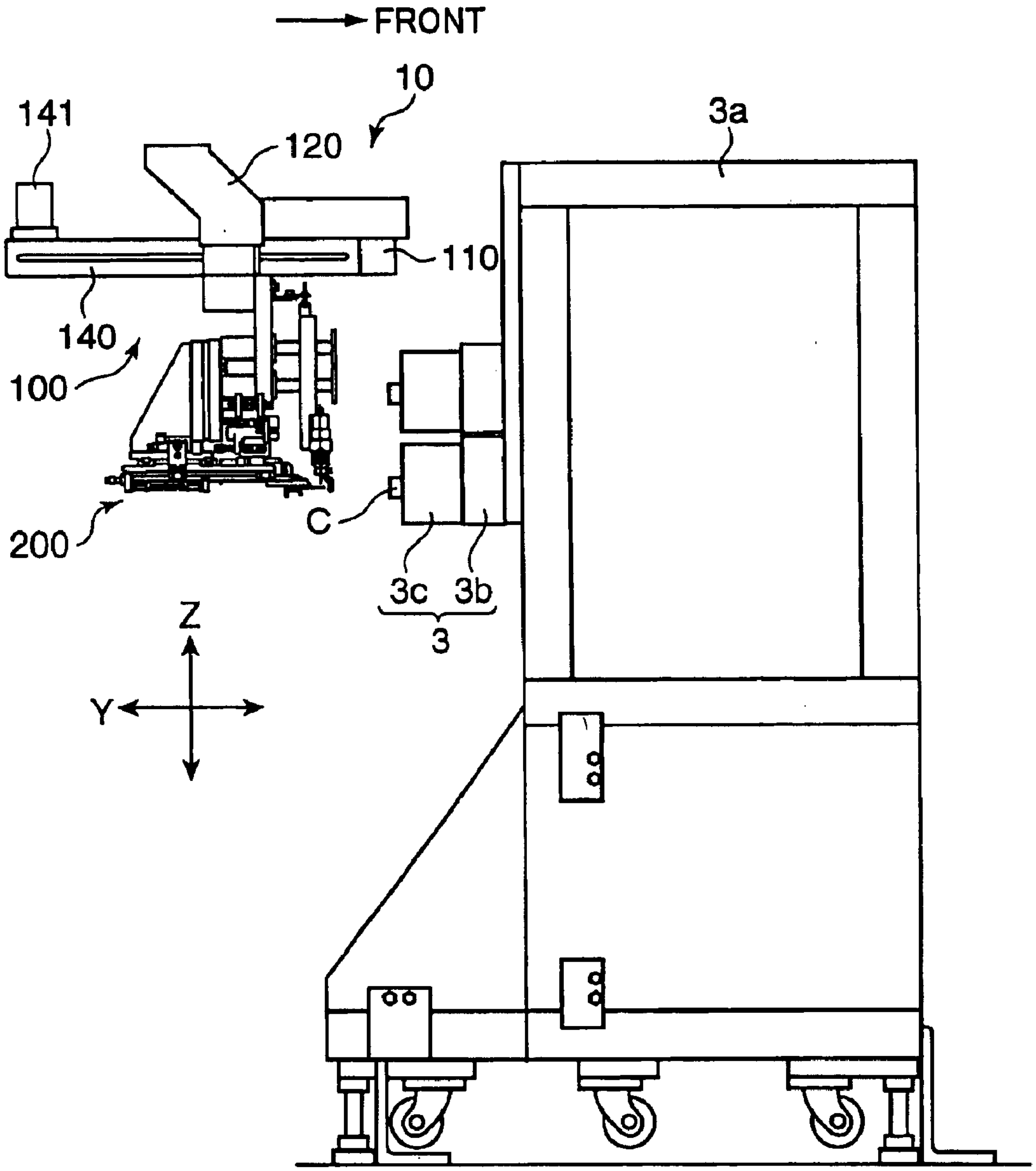
FIG. 3 is a side view of a terminal inserting station according to the embodiment.

FIG. 3 is a side view of the terminal inserting station ST8 of this embodiment.

With reference to FIGS. 2 and 3, the connector housing feeding unit 3 has a frame 3*a* assembled into a substantially rectangular parallelepiped. The frame 3*a* extends from the terminal inserting station ST8 to the product unloading station ST9, and carries a connector housing board 3*c* such that the connector housing board 3*c* can reciprocate between the two stations ST8 and ST9 via a horizontally extending uniaxial robot 3*b*. The connector housing board 3*c* carries the connectors C as elements of a wiring harness to be produced at a production line according to this embodiment, whereby the connector housings C can be fed to the wire connecting apparatus 10 provided in the terminal insertion station ST8, and the terminal-connected wires TW are connected with the connector housings C by the wire connecting apparatus 10. Accordingly, the produced wiring harness can be conveyed to the product unloading station ST9. In the shown example, the connector housing boards 3*c* are provided at two upper and lower stages.

The wire connecting apparatus 10 includes a driving mechanism 100 and an inserting robot 200 to be driven by the driving mechanism 100 as described in detail later. The driving mechanism. 100 is displaceable between a receiving position (phantom-lined position in FIG. 2) where the inserting robot 200 receives the terminal-connected wire TW from the transferring unit 2 of the transferring/inverting station ST7 and an inserting position (solid-lined position in FIG. 2) where the terminals T are inserted into the connector housings C in the connector housing feeding unit 3 of the terminal inserting station ST8. The terminals T of the terminal-connected wires TW received from the transferring unit 2 can be successively inserted into the cavities C2 (see FIGS. 1A and 1B) of the connector housings C held in the connector housing feeding unit 3.

The product unloading station ST9 is provided with an unloading space for unloading the connector housings C from the connector housing feeding unit 3. The uniaxial robot 3*b* of the connector housing feeding unit 3 can reciprocate between a position where the connector housing board 3*c* faces this unloading space and a position where the connector housing board 3*c* faces the wire connecting apparatus 10 in the terminal inserting station ST8 in synchronism with the operation timings of the respective units provided in the respective stations ST1 to ST8. Accordingly, an unillustrated operator can mount the connector housings C on the connector housing board 3C when the empty connector housing board 3*c* is facing this unloading space, and can detach the connector housings C of the wiring harness from the connector housing board 3*c* when the connector housing board 3*c* carrying the wiring harness returns to the unloading space. As a result, the feeding of the connector housings C and the unloading of the wiring harness can be continuously performed by repeating these operations.

Next, the wire connecting apparatus 10 of this embodiment is described with reference to FIGS. 3 to 8.

As shown in FIG. 3, the wire connecting apparatus 10 includes the driving mechanism 100 and the inserting robot 200 to be driven by the driving mechanism 100. In the following description, it is assumed that a direction along which the respective stations ST1 to ST8 are arranged is an X-direction, a horizontal direction normal to the X-direction is a Y-direction and a vertical direction normal to the X-direction is a Z-direction.

The driving mechanism 100 is formed by a triaxial robot and includes an X-direction driving unit 110 for governing X-direction driving, a Z-direction driving unit 120 mounted on the X-direction driving unit 110 for governing Z-direction driving, and a Y-direction driving unit 140 mounted on the Z-direction driving unit 120 for governing Y-direction driving. Thus, the inserting robot 200 is driven to reciprocate along the X-direction, Y-direction and Z-direction by the respective driving units 110, 120, 140. In this embodiment, the connecting operation for the terminal-connected wire TW is performed by a driving motor 141 of the Y-direction driving unit 140. A driving amount $D_x$ by the driving motor 141 is precisely given by an unillustrated rotary encoder. In this way, the Y-direction driving unit 140 forms a driver in this embodiment.

Next, the inserting robot 200 is described.

Figure 4:
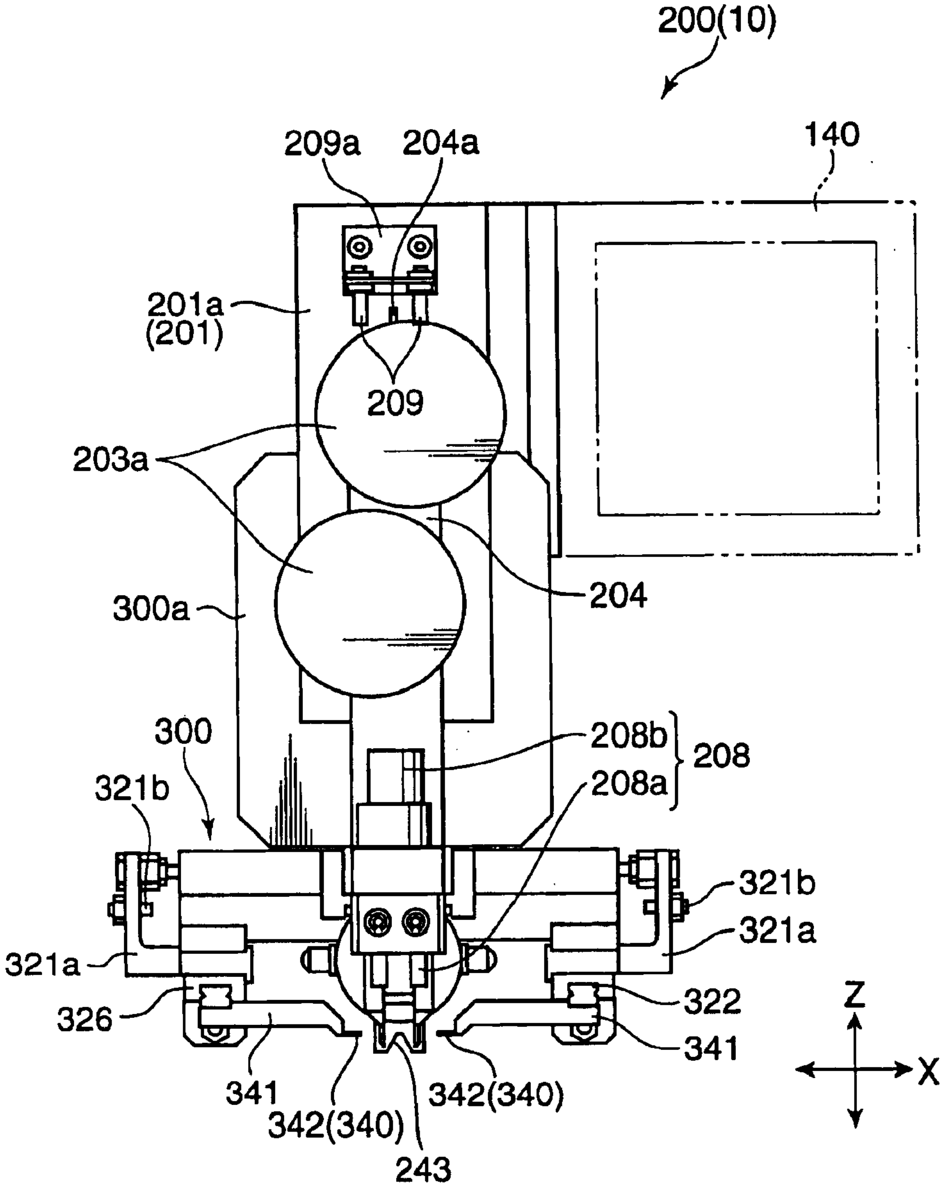
FIG. 4 is a schematic front view of an inserting robot according to the embodiment.
Figure 5:
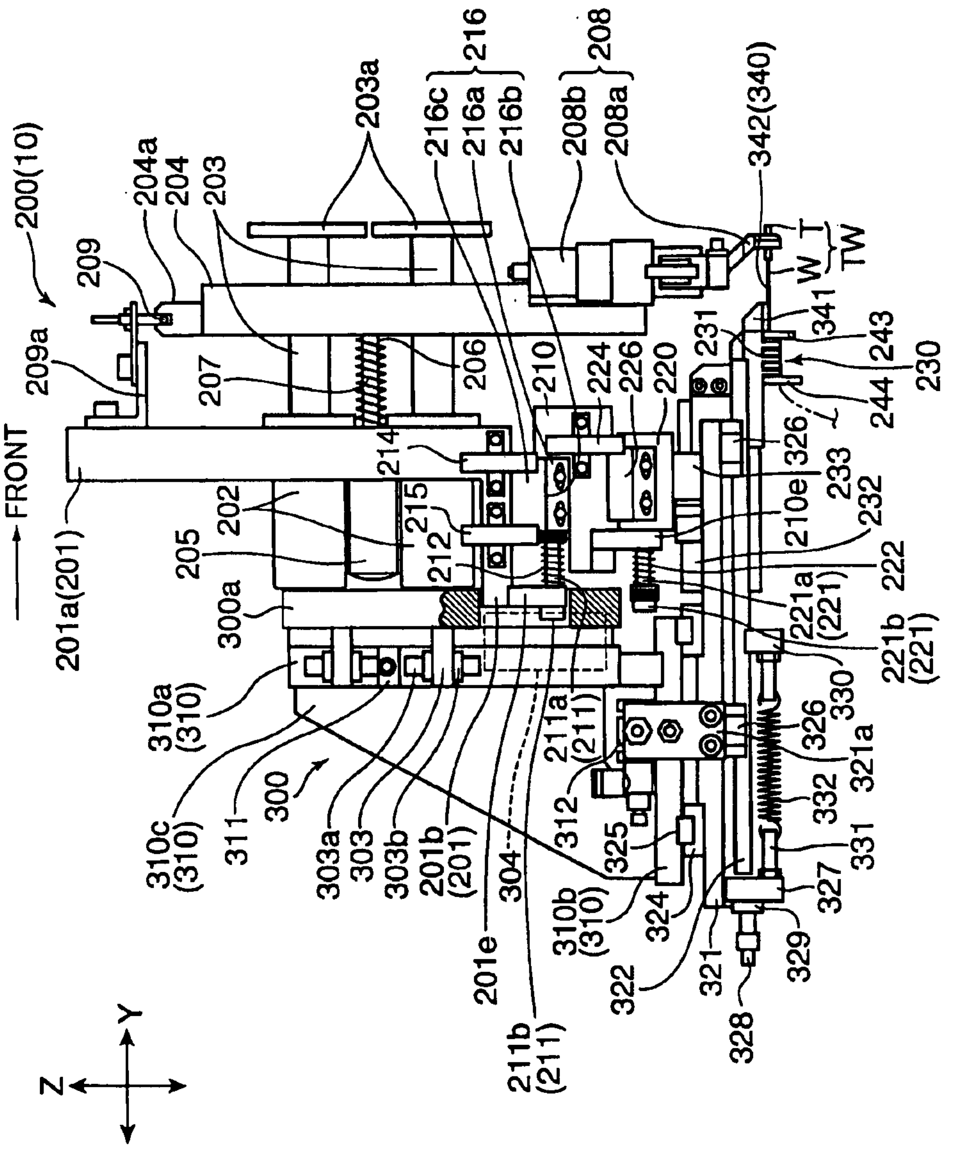
FIG. 5 is a side view of the inserting robot at an initial stage before an inserting operation.
Figure 6:
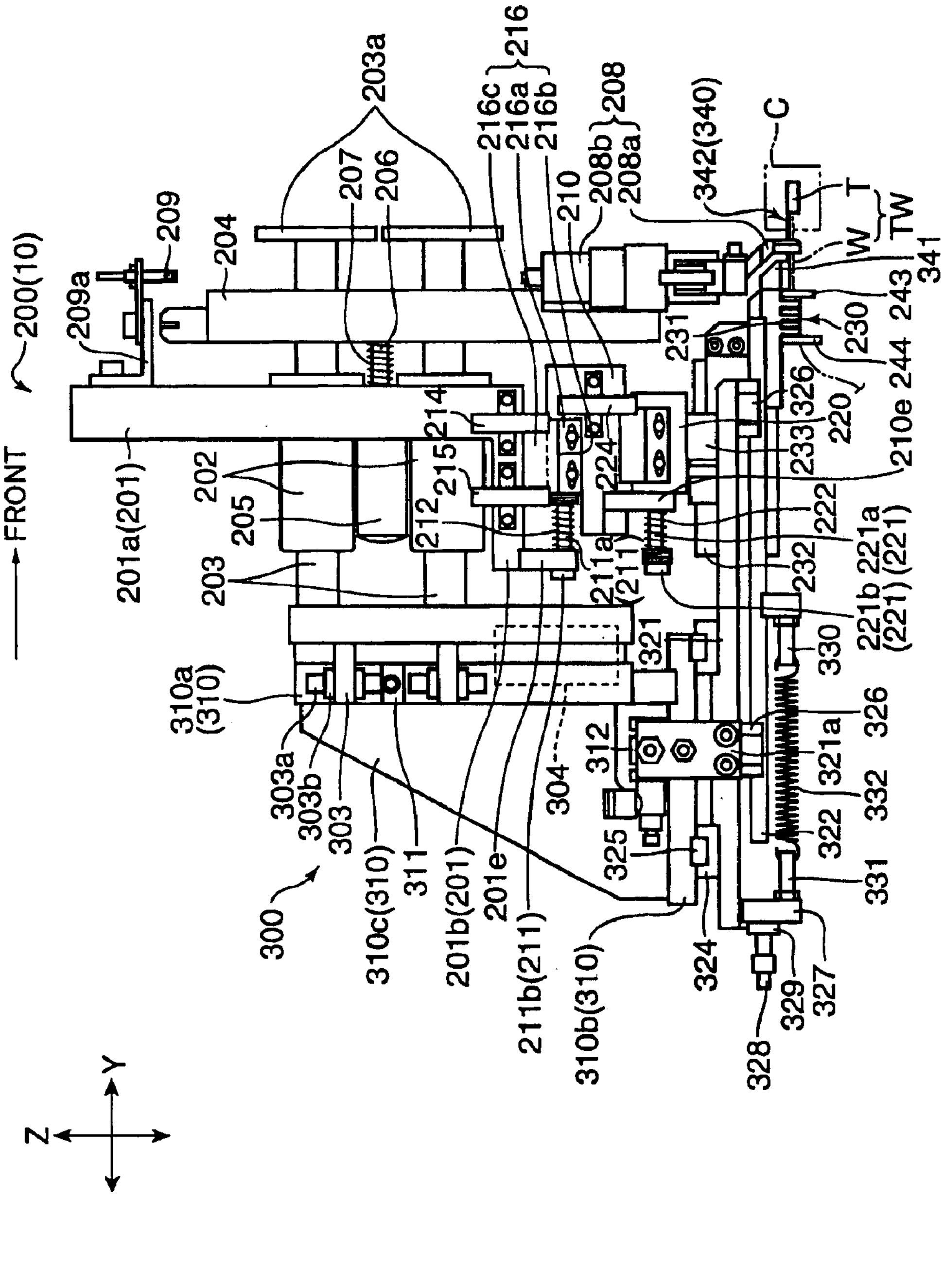
FIG. 6 is a side view of the inserting robot during the inserting operation.
Figure 7:
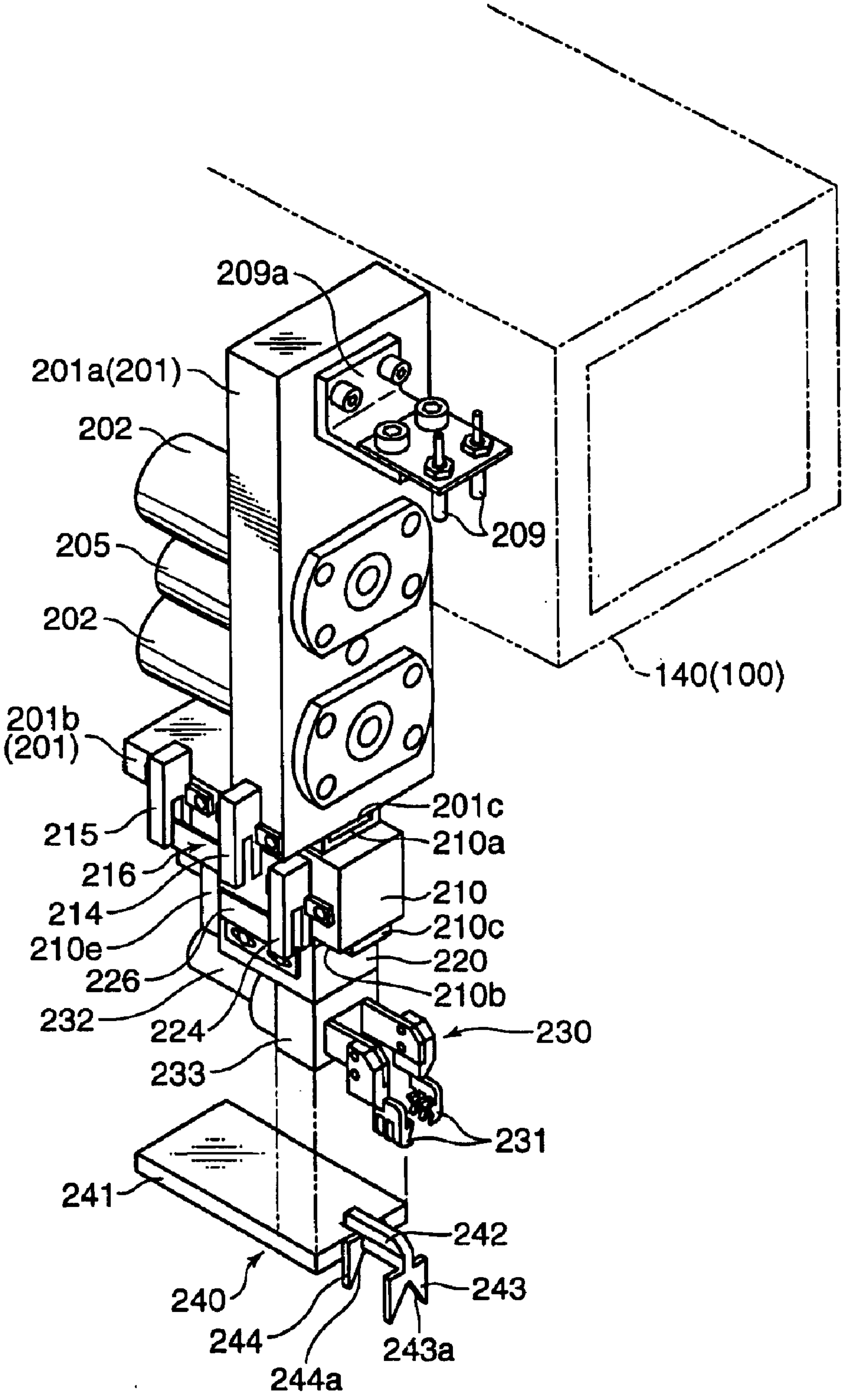
FIG. 7 is a perspective view schematically showing an essential portion of the inserting robot.
Figure 8:
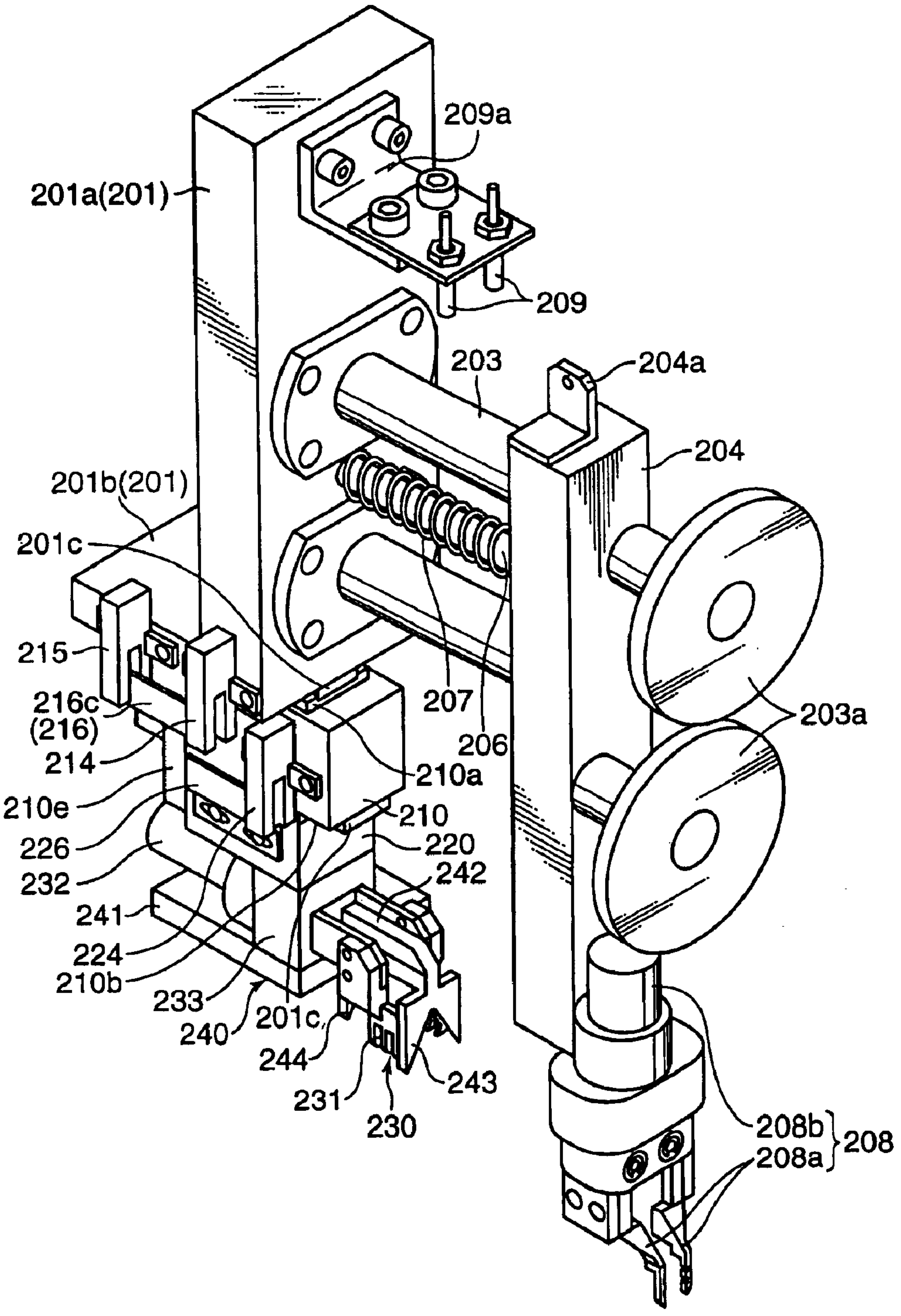
FIG. 8 is a perspective view schematically showing another essential portion of the inserting robot.

FIG. 4 is a schematic front view of the inserting robot 200 according to this embodiment; FIGS. 5 and 6 are side views of the inserting robot 200 showing an initial state before the insertion and a state during the insertion, respectively; and FIGS. 7 and 8 are schematic perspective views showing an essential portion of the inserting robot 200.

With reference to FIGS. 4 to 8, the shown inserting robot 200 has a coupling plate 201 coupled to the Y-direction driving unit 140 of the driving mechanism 100. The coupling plate 201 is a metal member having an L-shaped side view and including an end plate portion 201*a* and a bottom plate portion 201*b* extending from the bottom end of the end plate portion 201*a* at right angles. During the assembling, the coupling plate 201 is placed such that the front surface of the end plate portion 201*a* faces the stations ST in the Y-direction and a free end of the bottom plate portion 201*b* extends toward a side opposite from the stations ST. In the following description, a side of the inserting robot 200 toward the stations ST is referred to as front.

A pair of upper and lower guide sleeves 202 are fixed to the end plate portion 201*a* while penetrating it. Guide bars 203 are relatively displaceably fitted into the respective guide sleeves 202 and extend in forward and backward directions. In the shown embodiment, contact disks 203 are secured to the front ends of the respective guide bars 203. The respective contact disks 203*a* come into contact with unillustrated stoppers provided in the connector housing feeding unit 3.

A front plate 204 fixed to intermediate positions of the guide bars 203 is disposed before the coupling plate 201. The front plate 204 is a frame member for carrying a terminal chuck 208. In the shown embodiment, a dog 204*a* is secured to the top of the front plate 204 and a photoelectric sensor 209 for detecting this dog 204*a* is secured to the front plate 204 via a stay 209*a*. The photoelectric sensor 209 can detect the dog 204*a* in the initial state shown in FIG. 5, and operates as shown in TABLE-1 in relation to the driving amount $D_x$ of the driving motor 141 along the Y-direction in order to judge whether or not the terminal T has been properly inserted at a pre-insertion position to be described later when the coupling plate 201 and the front plate 204 are relatively displaced in the inserting process.

TABLE 1

| STATE | DRIVING AMOUNT $D_x$ OF DRIVING MOTOR 141 | SENSOR 209 |
|---|---|---|
| Initial State | $D_x = 0$ | ON |
| Good | $D_x$ = Driving Amount to Pre-Insertion Position | ON |
| Defect (e.g. Collision of Terminals) | $D_x$ = Driving Amount to Pre-Insertion Position | OFF |
| During Insertion | $D_x \geqq$ Driving Amount to Pre-Insertion Position | Not Controlled |

As a result, in this embodiment, a starting point of an inserting stroke can be detected after the terminal chuck 208 searchingly inserts the terminal T of the terminal-connected wire TW into the connector housing C.

A cylinder 205 is fixed between the two guide bars 203 of the end plate portion 201*a*. The cylinder 205 projects backward of the end plate portion 201*a*, and a rear part of a rod 206 extending in parallel with the respective guide bars 203 is slidably accommodated in the cylinder 205. An unillustrated stopping flange is formed at the rear end of the rod 206, and a displacement stroke of the rod 206 is specified by the stopping flange and a raised portion (not shown) formed in the cylinder 205. The leading end of the rod 206 is secured to the rear end of the front plate 204, and a coil spring 207 provided between the end plate portion 201*a* and the front plate 204 is mounted on the outer circumferential surface of the rod 206. Accordingly, the front plate 204 can be normally spaced away from the end plate portion 201*a* of the coupling plate 201 only by the stroke specified by the stopping flange and the raised portion of the cylinder 205 by a biasing force of the coil spring 207, and can be retracted backward against the biasing force of the coil spring 207 in the inserting process to be described later.

Figure 11:
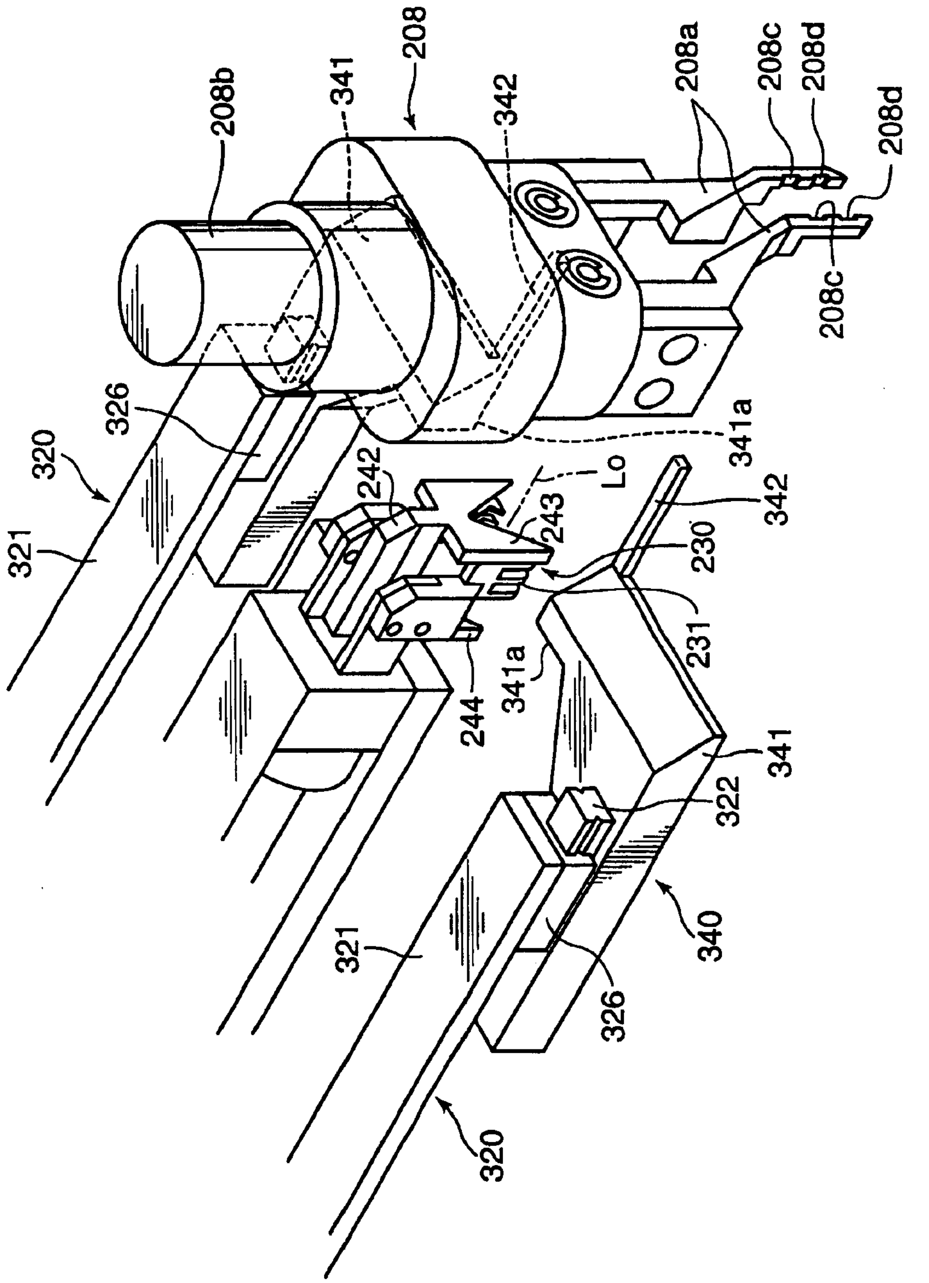
FIG. 11 is a perspective view showing an essential portion of a terminal inserting mechanism according to the embodiment.

The terminal chuck 208 includes a pair of clamping claw 208*a* and an actuator 208*b* for opening and closing the clamping claws 208*a* (moving the clamping claws 208*a* toward and away from each other) (see FIG. 11), holds the terminal T of the terminal-connected wire TW received from the unillustrated inverting unit in the transferring/inverting station ST7 (see FIG. 2) and contributes to the terminal inserting operation in terminal inserting station ST8. A basic construction of the terminal chuck 208 is substantially the same as a known construction, but largely differs in that a pair of guide grooves 208*c* for guiding the terminal into the cavity C2 at the upper stage and a pair of guide grooves 208*d* for guiding the terminal into the cavity C2 at the lower stage are formed in conformity with the specification of the connector housing C (see FIG. 1A) as shown in FIG. 11.

On the other hand, a rear plate 300*a* fixed to the rear ends of the guide bars 203 is disposed behind the coupling plate 201. The rear plate 300*a* is a structural member forming an insulation-displacement terminal inserting unit 300 for inserting the terminal T as described in detail later.

A wire clamping unit 230 constituting one terminal inserter is coupled to the bottom of the coupling plate 201 via checking blocks 210, 220 arranged at two upper and lower stages.

First, the checking block 210 includes a slide guide 210*a* (see FIG. 7). The slide guide 210*a* is coupled to a slide rail 201*c* (see FIG. 7) formed on the bottom surface of the bottom plate portion 201*b* of the coupling plate 201. Thus, the checking block 210 is relatively displaceable forward and backward with respect to the coupling plate 201. On the other hand, a driving plate 201*e* is fixed to the bottom plate portion 201*b* of the coupling plate 201 to hang down therefrom. A bolt 211 is so inserted through the driving plate 201*e* from behind as to be relatively displaceable. The bolt 211 is fixed only at one end with an externally threaded portion 211*a* thereof fixed to the rear part of the checking block 210. A head 211*b* of the bolt 211 faces the rear surface of the coupling plate 201 to restrict a backward movement of the driving plate 201*e*. Accordingly, the coupling plate 201 and the checking block 210 are relatively displaceably coupled such that the driving plate 201*e* is relatively displaceable by a stroke defined between the head 211*b* of the bolt 211 and the checking block 210. A coil spring 212 mounted on the outer circumferential surface of the externally threaded portion 211*a* of the bolt 211 is provided between the checking block 210 and the driving plate 201*e*. The checking block 210 is normally relatively biased forward with respect to the coupling plate 201 by a biasing force of the coil spring 212, whereby the head 211*b* of the bolt 211 is held in contact with the rear surface of the driving plate 201*e*. Here, the biasing force of the coil spring 212 is set to be larger than a force for driving the wire clamping unit 230 in its free state forward via the checking blocks 210, 220 and to be smaller than a force required to deform the insulation-displacement terminal forming the terminal-connected wire TW. Accordingly, when a forward-pushing force is transmitted to the coupling plate 201 via the driving plate 201*e* after the terminal of the terminal-connected wire TW is properly mounted into the connector housing C during an insertion check to be described later, the coupling plate 201 (accordingly the driving plate 201*e*) is relatively moved forward with respect to the checking block 210 while elastically compressing the coil spring 212. Thus, for the terminal-connected wire TW having the insulation-displacement terminal connected therewith, a connection check can be performed without pulling the terminal-connected TW by detecting this relative displacement.

In order to detect the relative displacement of the coupling plate 201 and the checking block 210, a pair of photoelectric sensors 214, 215 are secured to a side surface of the bottom plate portion 201*b* of the coupling plate 201. On the other hand, a plate-shape dog 216 is secured to a side portion of the checking block 210. This dog 216 is a metallic plate member bent like a crank shaft in front view, and is integrally formed with a base portion 216*a* secured to the side portion of the checking block 210 by a screw, a shoulder portion 216*b* horizontally extending from an upper portion of the base portion 216*a* in a direction away from the checking block 210, and a detectable portion 216*c* vertically extending from an free end (side opposite from the checking block 210) of the shoulder portion 216*b* in a bent manner. The respective photoelectric sensors 214, 215 are arranged at such positions as to detect the opposite front and rear sides of the detectable portion 216*c* of the dog 216, and are set as in TABLE-2 in relation to a compressed amount $D_{212}$ of the coil spring 212.

TABLE 2

| STATE | COMPRESSED AMOUNT $D_{212}$ OF COIL SPRING 212 | SENSOR 214 | SENSOR 215 |
|---|---|---|---|
| Initial State | $D_{212} = 0$ | ON | OFF |
| Defect (No Housing, etc.) | $D_{212} < 1.8$ mm | ON | OFF |
| Good | 1.8 mm $\leqq D_{212} \leqq$ 2.2 mm | ON | ON |
| Defect (Getting Caught, etc.) | $D_{212} > 2.2$ mm | OFF | ON |

As a result, a detection as to whether or not the connection of the terminal-connected wire TW having the insulation-displacement terminal connected therewith is good can be made by displacing the checking block 210 by a specified amount with respect to the coupling plate 201.

With reference to FIGS. 7 and 8, the checking block 220 includes an unillustrated slide guide. This slide guide is coupled to a slide rail 210*c* (see FIG. 7) formed on the bottom surface of the checking block 210. Thus, the checking block 220 is relatively displaceable forward and backward with respect to the checking block 210. On the other hand, a driving plate 210*e* is so fixed to the rear end of the bottom plate portion 210*b* of the checking block 210 as to hang down. A bolt 221 is so inserted through the driving plate 210*e* from behind as to be relatively displaceable. The bolt 221 is fixed only at one end with an externally threaded portion 221*a* thereof fixed to the rear part of the checking block 220. A head 221*b* of the bolt 221 faces the rear surface of the driving plate 210*e* of the checking block 210 to restrict a backward movement of the driving plate 210*e*. Accordingly, the checking blocks 210, 220 are relatively displaceably coupled such that the driving plate 210*e* is relatively displaceable by a stroke defined between the head 221*b* of the bolt 221 and the checking block 220. A coil spring 222 mounted on the outer circumferential surface of the externally threaded portion 221*a* of the bolt 221 is provided between the driving plate 210*e* and the head 221*b* of the bolt 221. The checking block 220 is normally relatively biased backward with respect to the checking block 210 by a biasing force of the coil spring 222, whereby the rear surface of the checking block 220 is held in contact with the driving plate 210*e*. Here, the biasing force of the coil spring 222 is set to be larger than a force for driving the wire clamping unit 230 in its free state backward via the checking block 220 and to be smaller than a force required to deform the crimping terminal forming the terminal-connected wire TW. Accordingly, in the case that the terminal-connected wire TW is a good product, the coil spring 222 is elastically compressed when the checking block 220 is driven backward via the driving plate 210*e* after the terminal of the terminal-connected wire TW is properly mounted into the connector housing C at the time of the insertion check to be described later. Thus, the checking block 210 (accordingly the driving plate 210*e*) is kept at a specified position. Thus, a conventional connection check can be made for the terminal-connected wire TW having the crimping terminal connected therewith by detecting the relative displacement of the two checking blocks 210, 220.

A photoelectric sensor 224 is secured to a side surface of the checking block 210 to detect a relative displacement of the checking blocks 210, 220. On the other hand, a plate-shaped dog 226 is secured to a side portion of the checking block 220. This dog 226 is a metallic plate member bent like a crank shaft in front view similar to the dog 216. The photoelectric sensor 224 is disposed at such a position as to detect the front side of the dog 226 and is set as in TABLE-3 in relation to the driving amount $D_x$ along the Y-direction by the driving motor 141.

TABLE 3

| Operation | Driving Amount $D_x$ of Driving motor 141 | Sensor 224 |
|---|---|---|
| Initial State | $D_x = 0$ | OFF |
| Inserting Operation | $D_x$ = inserted amount | OFF |
| Good | $-D_x$ (Pulling operation) | ON |
| Defect (Terminal Withdrawal) | $-D_x$ (Pulling operation) | OFF |

As a result, whether or not the connection of the terminal-connected wire TW having the crimping terminal connected therewith is good can be judged by displacing the checking block 220 by a specified distance with respect to the checking block 210.

Subsequently, the wire clamping unit 230 receives and clamps the insulated wire W of the terminal-connected wire TW from the unillustrated inverting unit at the transferring/inverting station ST7 (see FIG. 2), and inserts the terminal T into the connector housing C in cooperation with the aforementioned terminal chuck 208 at the terminal inserting station ST8 in the case that the clamped terminal-connected wire TW includes the crimping terminal.

With reference to FIGS. 7 and 8, the wire clamping unit 230 includes a pair of comb-shaped claws 231 and an actuator 232 for opening and closing the respective comb-shaped claws 231 (moving the comb-shaped claws 231 toward and away from each other).

The actuator 232 has a substantially rectangular box portion 233. This box portion 233 is secured to the bottom surface of the checking block 220 at the lower stage. Thus, a driving force from the coupling plate 201 is transmitted to the wire claming unit 230 through the checking blocks 210, 220, whereby the wire clamping unit 230 can perform the inserting operation.

A lever driving member 240 is attached to the wire clamping unit 230. The lever driving member 240 integrally includes a plate portion 241 secured to the bottom surface of the box portion 233, a cantilever-shaped projection 242 projecting from the front end of the plate portion 241, and a pair of wire guides 243, 244 arranged at the front and rear sides of the projection 242.

The projection 242 is located between the respective comb-shaped claws 231 while avoiding interferences with them.

The respective wire guides 243, 244 are formed with guide slits 243*a*, 244*a* widened toward their bottom ends to be triangular in front view. When the comb-shaped claws 231 of the wire clamping unit 230 receive and clamp the terminal T of the terminal-connected wire TW from the unillustrated inverting unit at the transferring/inverting station ST7 (see FIG. 2), the guide slits 243*a*, 244*a* function to guide the insulated wire W clamped by the inverting unit to a position between the comb-shaped claws 231. In addition, the wire guide 243 fixed to the front end of the projection 242 has a function as a driving member for driving an inserting claw 340 of the insulation-displacement terminal inserting unit 300 as the terminal inserter to be described next.

Next, the insulation-displacement terminal inserting unit 300 is described with reference to FIGS. 9 to 12.

Figure 9:
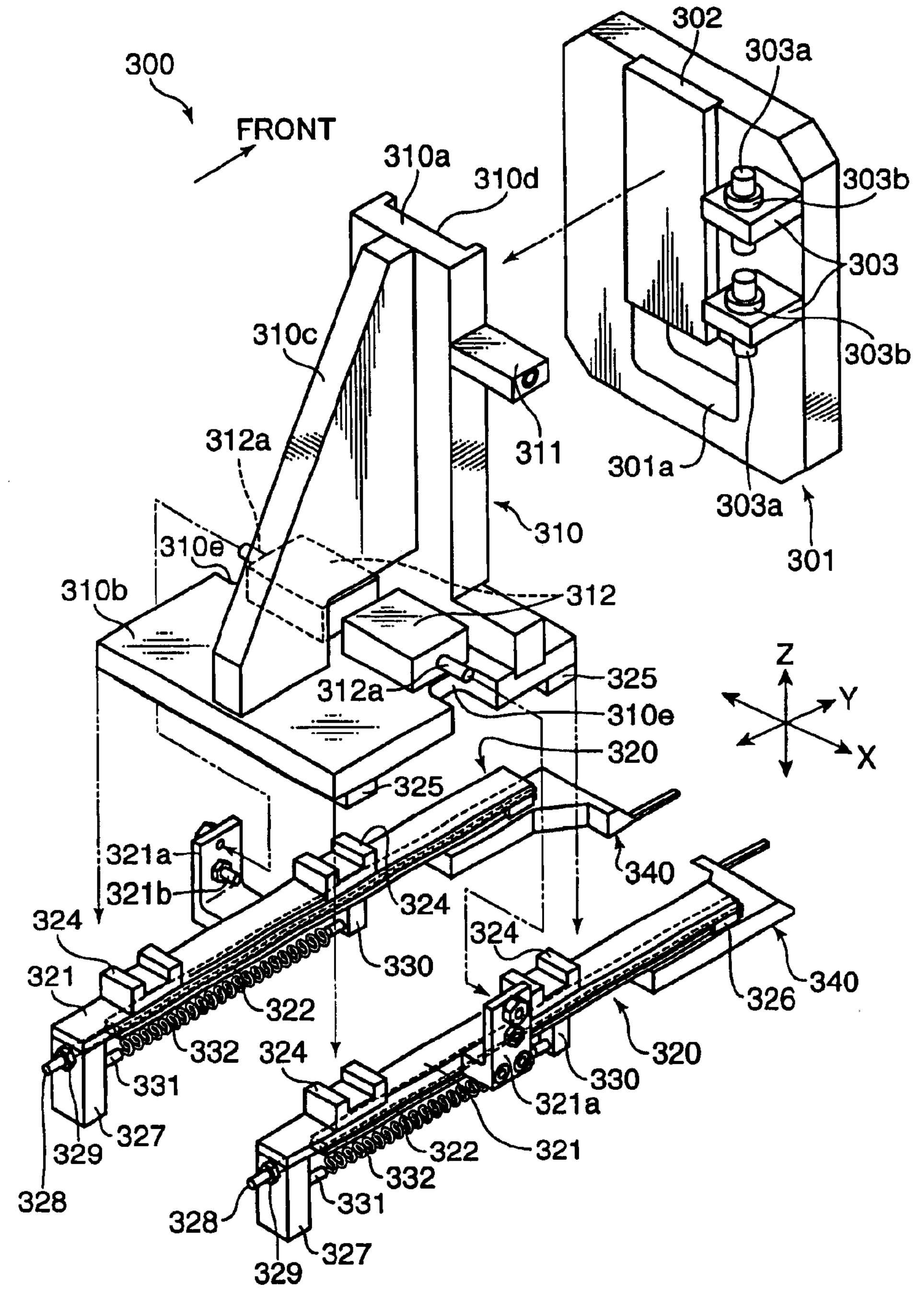
FIG. 9 is an exploded perspective view showing an entire construction of an insulation-displacement terminal inserting unit according to the embodiment.

FIG. 9 is an exploded perspective view showing the entire construction of the insulation-displacement terminal inserting unit according to this embodiment.

With reference to FIG. 9, the insulation-displacement terminal inserting unit 300 includes the aforementioned rear plate 300*a* and a main frame 310 to be mounted on this rear plate 300*a*. A vertically extending guide rail 302 is secured to the rear surface of the rear plate 300*a*. A pair of projections 303 project backward from the rear surface of the rear plate 300*a* at one side of the guide rail 302. A bolt 303*a* is secured to each projection 303 by a nut 303*b* while vertically penetrating the projection 303, and a vertical stroke of the main frame 301 is specified between the two bolts 303*a*. In this embodiment, an opening 301*a* is formed in a lower part of the rear plate 300*a* to avoid an interference with the bottom plate portion 201*b* of the coupling plate 201 (see FIG. 5).

The main frame 310 is a structural member integrally comprised of an end plate portion 310*a*, a bottom plate portion 310*b* and a reinforcing portion 310*c* for reinforcing the two plate portions 310*a*, 310*b*.

A groove 310*d* in which the guide rail 302 of the rear plate 300*a* is slidably fittable is formed in the front surface of the end plate portion 310*a*. Further, a locking projection 311 to be located between the pair of projections 303 (accordingly between the bolts 303*a*) formed on the rear plate 300*a* projects on a side portion of the end plate portion 310*a*. Thus, the main frame 310 is so coupled as to be vertically movable by the stroke defined between the bolts 303*a* of the rear plate 300*a* as a whole.

The main frame 310 is vertically driven by an air cylinder 304 (shown only by broken line in FIGS. 5 and 6) fixed to the rear surface of the rear plate 300*a*. Since the main frame 310 and members mounted on this main frame 310 can be vertically displaced within a range specified between the bolts 303*a* and the projection 311 by the air cylinder 304, the inserting claws 340 can be driven upward and downward in conformity with the state of the terminal T as described later (see FIGS. 15A and 15B).

A pair of air cylinders 312 are fixed to the bottom plate portion 310*b*. The respective air cylinders 312 are concentrically arranged while their longitudinal axes oriented in the X-direction. Rods 312*a* of the air cylinders 312 are mounted through brackets 321*a* of corresponding guide frames 320 to be described next to drive the guide frames 320 along the X-direction. As a result, the inserting claws 340 can be selectively coupled to the wire clamping unit 230 to insert the terminal T.

Figure 10:
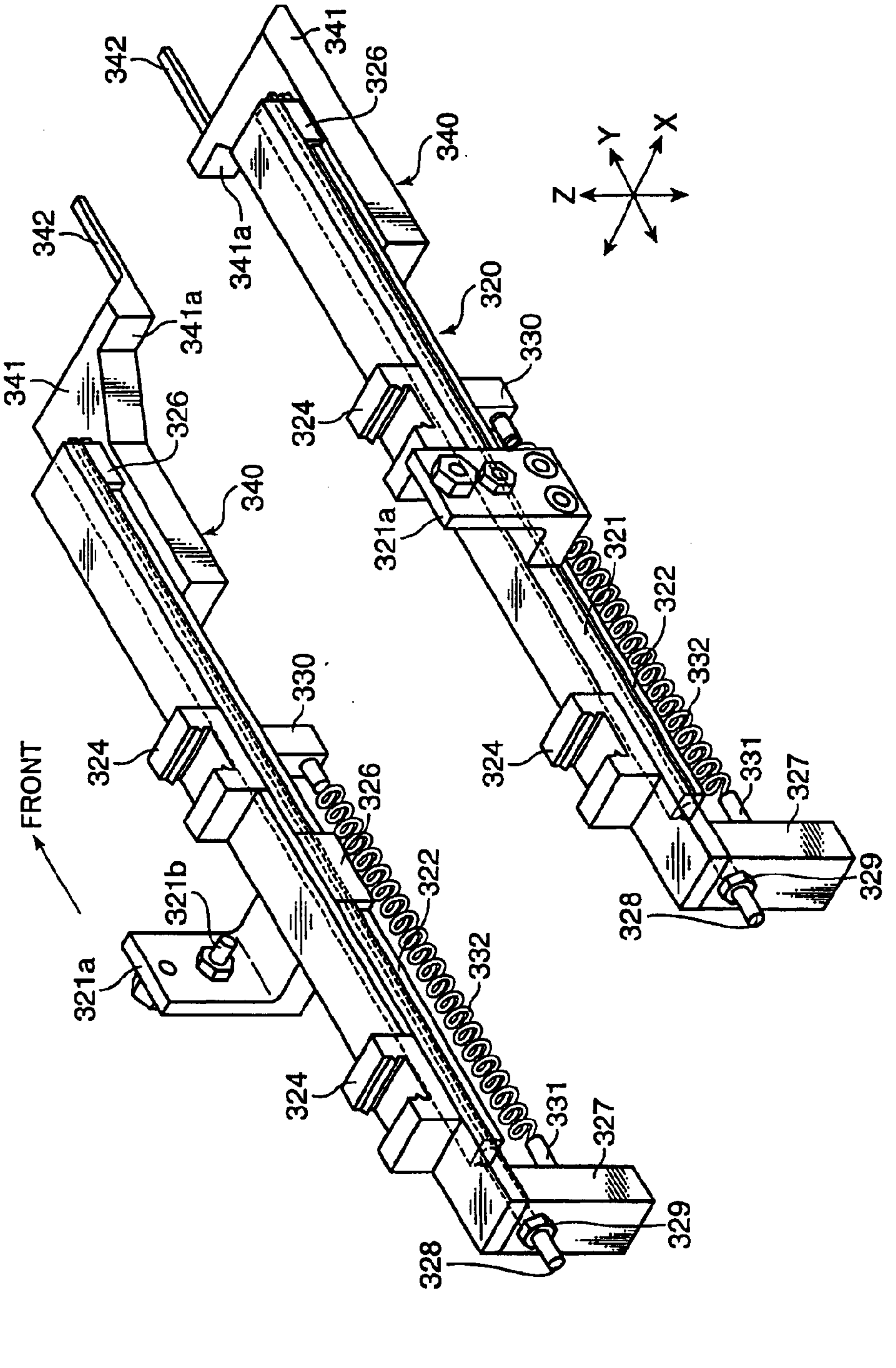
FIG. 10 is a perspective view showing a schematic construction of a guide frame according to the embodiment.

FIG. 10 is a perspective view showing schematic constructions of the guide frames 320 according to this embodiment.

With reference to FIGS. 9 and 10, each guide frame 320 is a unit including a main frame 321, a guide rail 322 to be guided by the main frame 321 and the inserting claw 340 fixed to the guide rail 322.

Each main frame 321 is arranged along the Y-direction. In order to couple the main frames 321 and the main frame 310, a pair of front and rear sliders 324 are fixed to the upper part of each main frame 321 and guide rails 325 for guiding these sliders 324 are fixed to the bottom of the bottom plate portion 310*b* of the main frame 310. Thus, the respective main frames 321 are relatively movable along the X-direction with respect to the main frame 310. The main frame 310 is formed with recesses 310*e* in which the brackets 321*a* of the respective main frames 321 can be accommodated, whereas bolts 321*b* to come into contact with the recesses 310*e* project from the brackets 321*a* and a stroke along the X-direction is specified by these bolts 321*b*.

The guide rail 322 guided by each main frame 321 is so coupled as to be relatively displaceable forward and backward by a pair of slide guides 326 fixed to the bottom of the main frames 321. Further, each main frame 321 is provided with a stay 327 hanging down from the rear end of this main frame 321. A bolt 328 facing the rear end surface of the guide rail 322 is secured to each stay 327 by a nut 329. A rear end position of each slide guide 325 is specified by this bolt 328.

A spring holder 330 hanging down from the bottom of each guide rail 322 is fixed at a longitudinal middle position of the guide rail 322, and a locking projection 331 facing the spring holder 329 is fixed to the stay 327. A tension coil spring 332 is mounted between each spring holder 330 and the corresponding locking projection 331. Each guide rail 322 is biased to a position where it is in contact with the bolt 328 by a biasing force of this tension coil spring 332.

The inserting claws 340 are fixed to the bottoms of the leading ends of the respective guide rails 32.

Figure 12A:
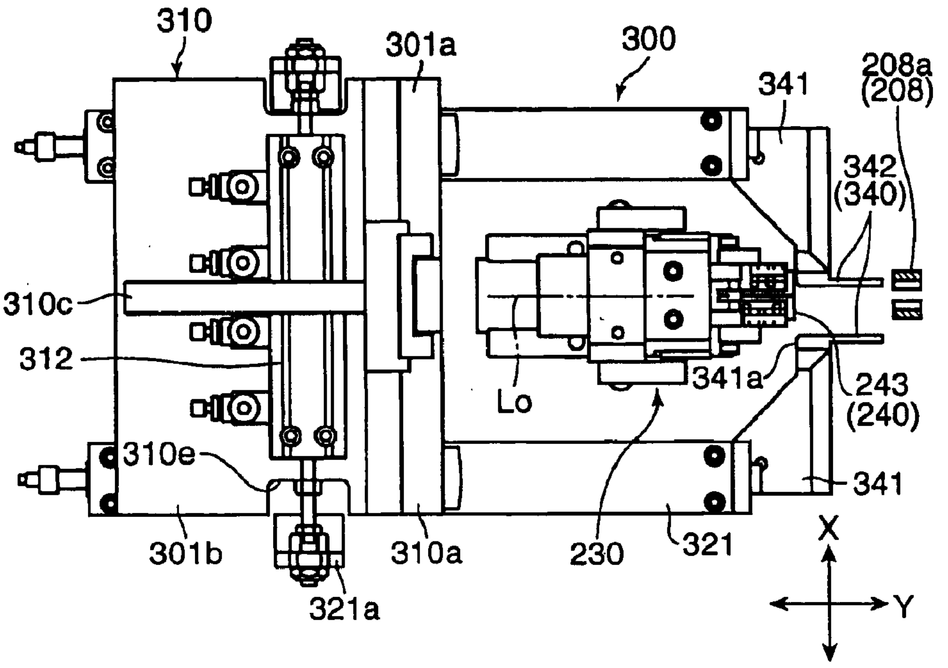
FIGS. 12A and 12B are schematic plan views of the terminal inserting mechanism.
Figure 12B:
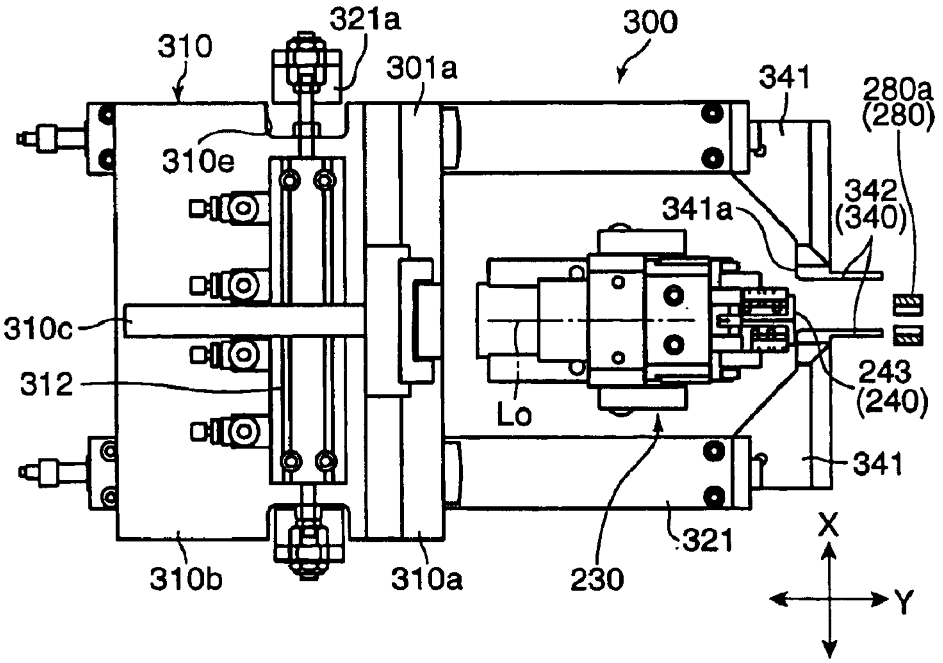

FIG. 11 is a perspective view showing an essential portion of a terminal inserting mechanism according to this embodiment, and FIGS. 12A and 12B are schematic plan views of this terminal inserting mechanism.

With reference to FIGS. 10 and 11, each inserting claw 340 is a metallic member integrally comprised of a block portion 341 secured to the corresponding guide rail 322 and an inserting bar 342 projecting forward from the leading end of this block portion 341. The inserting bars 342 of the respective inserting claws 340 take different specifications in conformity with the dimensions of the insulation-displacement terminals of the terminal-connected wires TW to be handled.

A polygonal cut is made at an inner side of each block portion 341 to narrow the width of a rear part of the block portion 341 lest the block portion 341 should interfere with the wire clamping unit 230 upon a displacement along the X-direction, and a pressure-receiving portion 341*a* is formed at a front part of the block portion 341. In the case that one guide frame 320 is displaced toward a center line Lo of the wire clamping unit 230 along the X-direction by the air cylinder 312 of the main frame 310 as shown in FIGS. 12A and 12B, the pressure-receiving portion 341*a* of the inserting claw 340 provided on this guide frame 320 is engaged with the wire guide 243 provided in the lever driving member 240 of the wire clamping unit 230. As a result, when the wire clamping unit 230 is driven forward by the coupling plate 201, this driving force is transmitted from the wire guide 243 of the lever driving member 240 to the inserting claw 340 via the pressure-receiving portion 341*a*, whereby the inserting bar 342 of the inserting claw 340 can perform the inserting operation. Further, in the case that both guide frames 320 are driven in directions away from the center line Lo by the air cylinders 312 as shown in FIG. 11, both inserting claws 340 are displaced to positions to expose the front part of the wire clamping unit 230. Thus, the wire clamping unit 230 can insert the terminal-connected wire TW having the crimping terminal connected therewith. In this way, the air cylinders 312 form an essential portion of an inserter selector for selecting one of the inserting operation by the wire clamping unit 230 and the inserting operation by the two kinds of inserting claws 340 in this embodiment.

Next, the operation is described. First, with reference to FIG. 2, the wire cut at the wire cutting station ST1 is successively conveyed by the wire conveyor 1 to the end working station ST2 (only the wire to be connected with a crimping terminal), to the end checking station ST3 and to the terminal connecting station ST4, whereby a terminal-connected wire is fabricated (fabricating step).

To the stations ST5 to ST9 following the terminal connecting station ST4, the terminal-connected wires TW having the crimping terminals connected therewith and those having the insulation-displacement terminals connected therewith are mixedly conveyed (mixed wire conveying step).

The respective terminal-connected wires TW are inverted, if necessary, at the transferring/inverting station ST7 after being subjected to the height check at the height checking station ST6. Thereafter, the terminal-connected wires TW are held by the wire connecting apparatus 10 displaced to the receiving position. At the inserting position in the terminal inserting station ST8, the terminal-connected wires TW having their terminals T are inserted into the connector housings C by the wire inserting apparatus 10, thereby being assembled into a wiring harness.

Next, the inserting operation of the wire connecting apparatus 10 at the terminal inserting station ST8 is described.

FIGS. 13 to 15 are partial schematic side views showing the operation procedure in this embodiment.

Figure 13A:
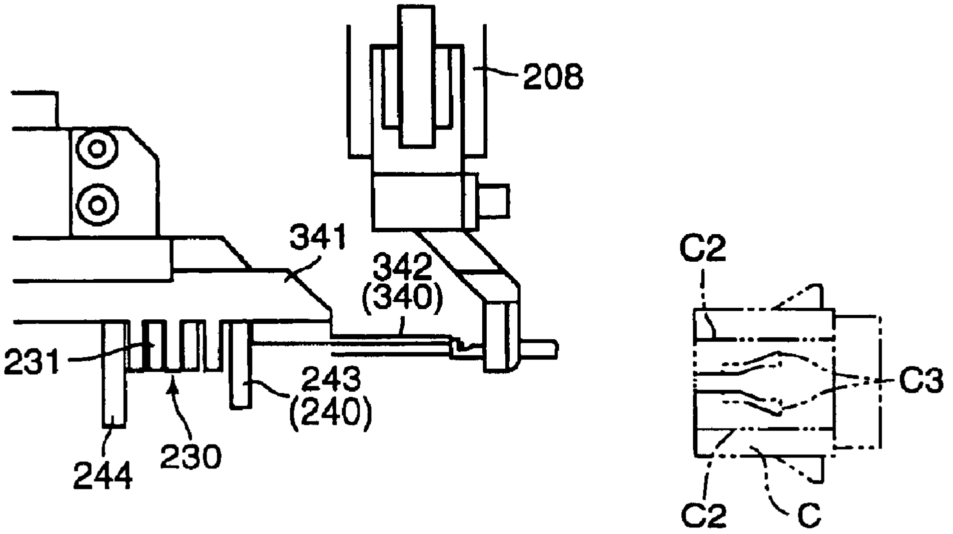
FIGS. 13A and 13B are partial schematic side views showing an operation procedure according to the embodiment.
Figure 13B:
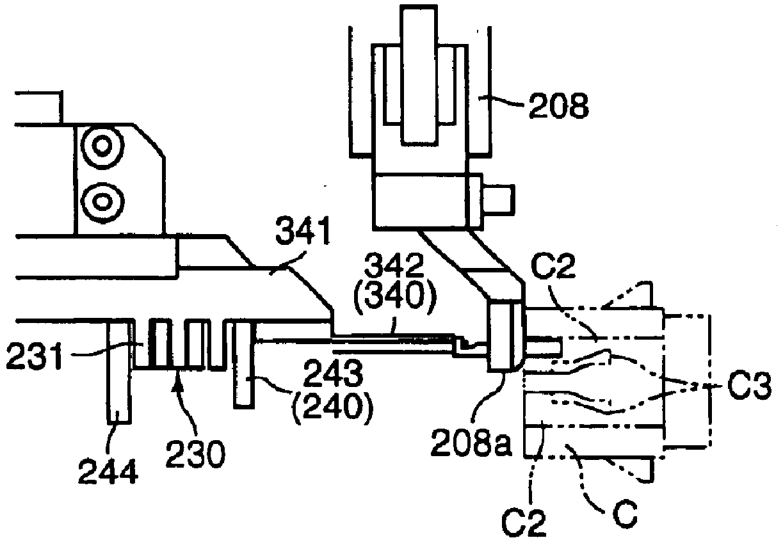

With reference to FIGS. 5 and 13A, the inserting robot 200 at the inserting position rigidly holds the terminal T and the wire W of the terminal-connected wire TW (wire holding step). Further, the terminal chuck 208 holds the terminal T in such a state that the leading end of the terminal T slightly projects forward (see FIG. 13A). In this state, the driving mechanism 100 (see FIG. 3) drives the inserting robot 200 to a position where the terminal T faces the corresponding cavity C2 by means of the X-direction and Z-direction driving units 110, 120 (insertion preparing step). Subsequently, upon receiving a driving force from the Y-direction driving unit 140 of the driving mechanism 100 via the coupling plate 201, the inserting robot 200 is moved forward as a whole. Thereafter, at a position where the terminal T of the terminal-connected wire TW is slightly inserted into the cavity C2 of the connector housing C as shown in FIG. 13B (this position is referred to as a pre-insertion position), the contact disks 203*a* provided on the guide bars 203 come into contact with the unillustrated stoppers and the terminal chuck 208 is half-opened to guide the terminal T while being permitted to make a displacement along the Y-direction. Here, if the terminal T held by the inserting robot 200 should come into collision with the connector housing C, the clamping claws 208*a* of the terminal chuck 208 cannot reach the pre-insertion position. Thus, the spring 207 is elastically compressed to turn the photoelectric sensor 209 off as shown in TABLE-1, whereby an abnormality can be detected.

On the other hand, if the terminal T is inserted into the cavity C2 at the pre-insertion position, the Y-direction driving unit 140 of the driving mechanism 100 continues to drive the coupling plate 201 forward even after the contact disks 203*a* come into contact with the stoppers. Thereafter, the photoelectric sensor 209 is not on/off-controlled any longer, the coupling plate 201 is moved relatively forward with respect to the front plate 204 against the biasing force of the coil spring 207, and the driving force of the Y-direction driving unit 140 is transmitted from the coupling plate 201 to the wire clamping unit 230 via the checking blocks 210, 220 arranged at the upper and lower stages (inserting step).

Figure 14A:
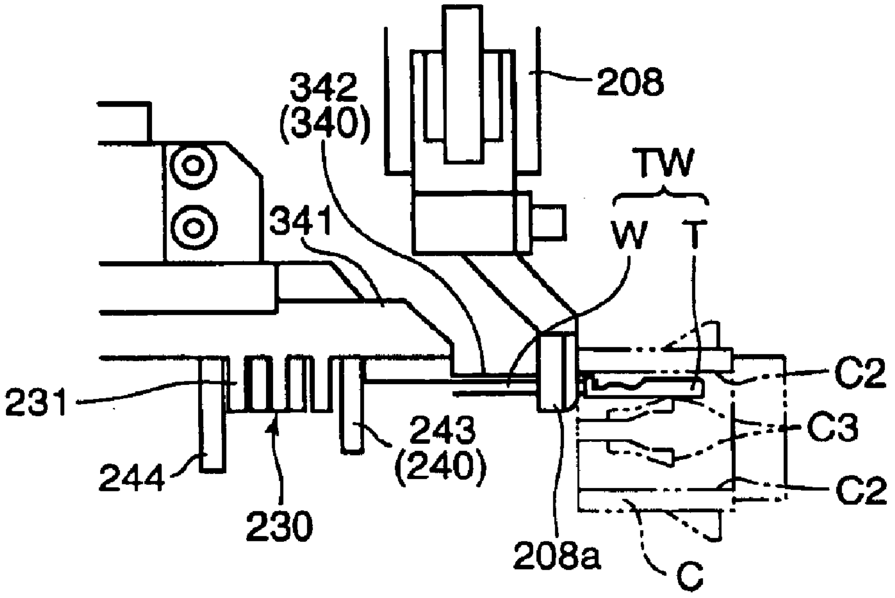
FIGS. 14A and 14B are partial schematic side views showing the operation procedure according to the embodiment.
Figure 14B:
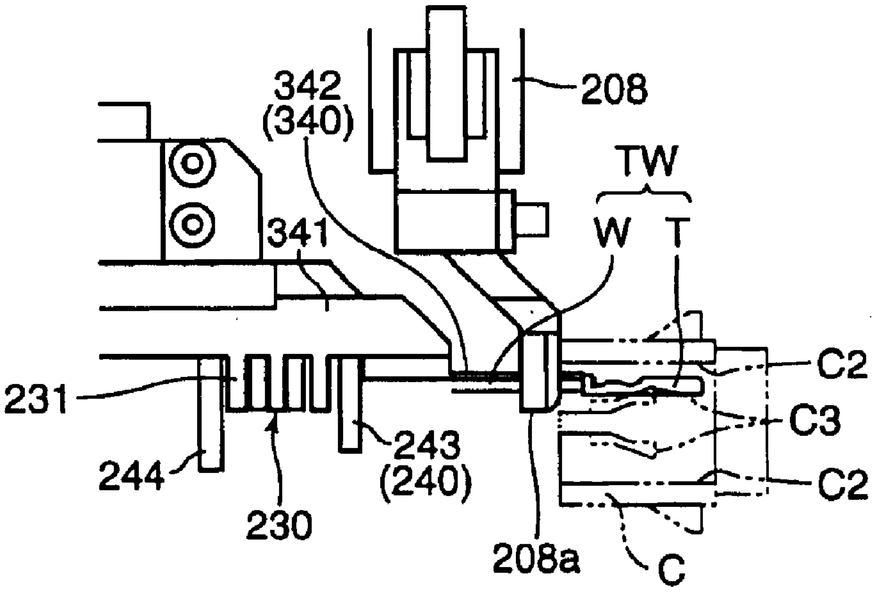

Here, if the terminal T of the terminal-connected wire TW to be inserted is an insulation-displacement terminal, the air cylinders 312 of the insulation-displacement terminal inserting unit 300 bring the guide frame 320 corresponding to this terminal T closer to the wire clamping unit 230 as shown in FIGS. 12A or 12B and couples the inserting claw 340 to the wire clamping unit 230. Simultaneously, the wire clamping unit 230 is half-opened to relatively displaceably guide the insulated wire W of the terminal-connected wire TW. As a result, if the driving force of the Y-direction driving unit 140 continues to be transmitted to the wire clamping unit 230, the terminal T of the terminal-connected wire TW is directly moved by the inserting bar 342 of the inserting claw 340 as shown in FIG. 14A to be inserted into the cavity C2 of the connector housing C. As a result, the terminal T advances while elastically deforming the locking tongue C3 formed in the cavity C2 and is engaged with the locking tongue C3 when the driving amount by the Y-direction driving unit 140 reaches $D_x$ as shown in FIG. 14B. Thereafter, the Y-direction driving unit 140 drives the coupling plate 201 further forward. At this time, if the terminal T is properly mounted in the cavity C2 of the connector housing C, the terminal T is prevented from coming out of the cavity C2 by the locking tongue C3 in the cavity C2. Thus, the driving plate 210*e* is relatively moved forward with respect to the checking block 220 against the biasing force of the coil spring 212. If the terminal T is improperly mounted, it is further moved forward, whereby the checking block 210 is also moved forward together with the checking block 220. As a result, the photoelectric sensor 224 is turned off as shown in TABLE-3, enabling a detection as to whether the inserted state is proper or improper.

Figure 15A:
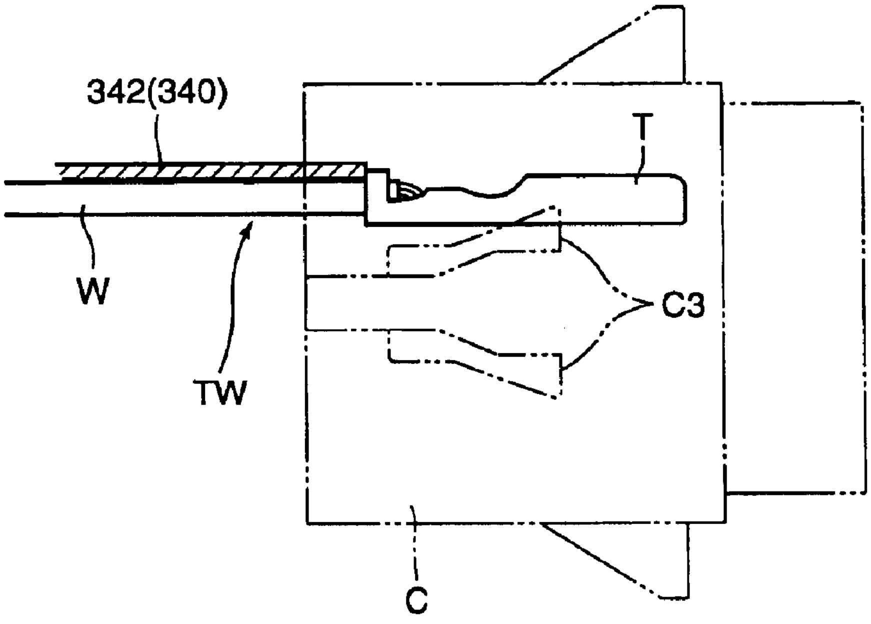
FIGS. 15A and 15B are partial schematic side views showing the operation procedure according to the embodiment.
Figure 15B:
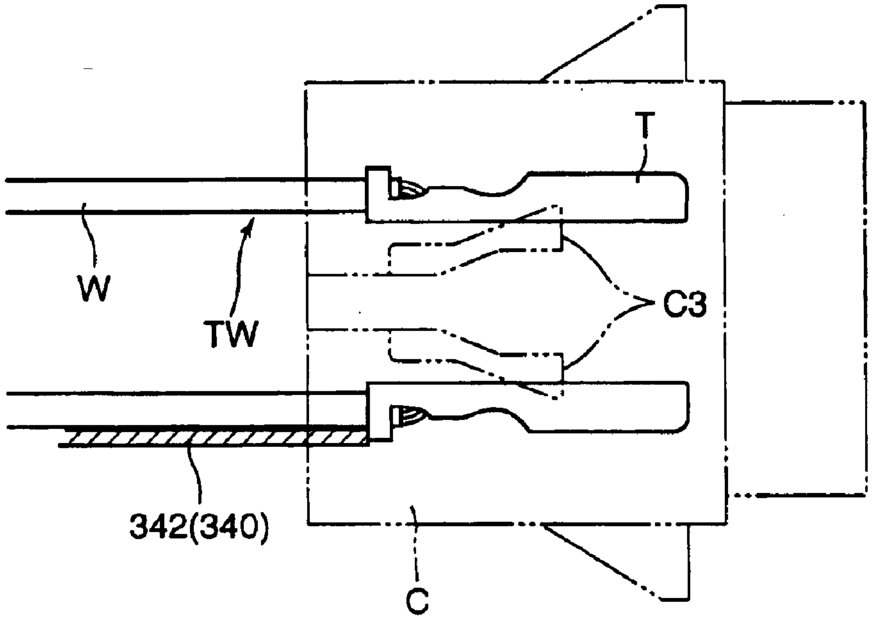

Next, with reference to FIGS. 15A, 15B and 5, if the terminal T to be connected is to be inserted into the cavity C2 at the upper stage of the connector housing C, the air cylinder 304 of the insulation-displacement terminal inserting unit 300 lifts the main frame 310 up against the rear plate 300*a*. This causes the inserting bar 342 of the inserting claw 340 to engage the rear end surface of the terminal T on the top of the insulated wire W as shown in FIG. 15A, enabling the inserting bar 342 to push the terminal T. On the contrary, if the terminal T to be connected is to be inserted into the cavity C2 at the lower stage of the connector housing C, the air cylinder 304 of the insulation-displacement terminal inserting unit 300 lowers the main frame 310 down against the rear plate 300*a*. This causes the inserting bar 342 of the inserting claw 340 to engage the rear end surface of the terminal T at the bottom of the insulated wire W as shown in FIG. 15B, enabling the inserting bar 342 to push the terminal T.

Next, if the terminal T of the terminal-connected wire TW to be inserted is a crimping terminal, the air cylinders 312 of the insulation-displacement terminal inserting unit 300 move the corresponding guide frames 320 away from the wire clamping unit 230 to expose the wire clamping unit 230 to the front. Simultaneously, the wire clamping unit 230 rigidly holds the insulated wire W of the terminal-connected wire TW. As a result, if the driving force of the Y-direction driving unit 140 continues to be transmitted to the wire clamping unit 230, the terminal T of the terminal-connected wire TW is inserted into the cavity C2 of the connector housing C by the force of the wire clamping unit 230 to move the insulated wire W. Thereafter, the Y-direction driving unit 140 drives the coupling plate 201 in an opposite direction in the same insertion procedure as the known one, whereby this driving force is transmitted from the driving plate 210*e* fixed to the checking block 210 arranged at the upper stage to the bolt 221 and the checking block 220 integral with the bolt 221 via the elastically compressed coil spring 222. At this time, if the terminal T is properly mounted in the cavity C2 of the connector housing C, the terminal T is prevented from coming out of the cavity C2 by the locking tongue C3 in the cavity C2. Thus, the driving plate 210*e* is relatively moved backward with respect to the checking block 220 against the biasing force of the coil spring 222. If the terminal T is improperly mounted, it is withdrawn upon being pulled, whereby the checking block 220 is also moved backward together with the checking block 210. As a result, the photoelectric sensor 224 is turned off as shown in TABLE-3, enabling a detection as to whether the inserted state is proper or improper.

As described above, according to this embodiment, a plurality of mechanisms (wire clamping unit 230, a pair of inserting claws 340) are adopted as the inserter for inserting the terminal T, and these mechanisms can be selectively used to perform the inserting operation in cooperation with the terminal chuck 208. Thus, a terminal inserting mechanism capable of performing a wide range of insertion operations can be constructed by a single unit (inserting robot 200). Thus, this embodiment has a remarkable effect of performing a wide range of inserting operations for inserting many kinds of terminal-connected wires.

The aforementioned embodiment is merely the illustration of a preferable specific example of the present invention, and the present invention is not limited thereto. It should be appreciated that various changes and modifications can be made without departing from the spirit and scope of the present invention as claimed.

As described above, an inventive method for producing a wiring harness, comprises the steps of: fabricating a terminal-connected wire by connecting a terminal with an end of an insulated wire; supplying a plurality of terminal-connected wires having different specifications along the same production line; holding the terminal of the supplied terminal-connected wire such that the terminal can be inserted into a cavity of a connector housing at least by a terminal chuck; selecting a suitable one from a plurality of terminal inserters for inserting the terminal in accordance with the kind of the supplied terminal-connected wire; and inserting the terminal facing the cavity into the cavity by the selected terminal inserter in cooperation with the terminal chuck.

The terminal inserter suitable for the terminal-connected wire is selected in accordance with the kind of the terminal-connected wire upon connecting the terminal-connected wire with the connector housing by inserting the terminal into the cavity of the connector housing. Thus, even if a plurality of terminal-connected wires having different specifications are conveyed along the same production line, the respective terminal-connected wires can be inserted into the connector housing in accordance with their specifications. Particularly, the terminal inserting operation can be performed by a unit including the commonly usable single terminal chuck since the selected terminal inserter adopts a method for inserting the terminal in cooperation with the terminal chuck. The “specifications” mainly mean a method for connecting the terminal connected at an end of the insulated wire and dimensions of the terminal.

An inventive apparatus for connecting a terminal-connected wire, comprises: a terminal chuck including a pair of claws for holding a terminal of a terminal-connected wire in which the terminal is connected with an end of an insulated wire beforehand, and a driving source for drivingly opening and closing the pair of claws; a terminal-push type inserter including a pushing member for directly pushing the terminal and adapted to insert the terminal by the pushing member; a wire-holding type inserter including a pair of claws which are openable and closable, the wire-holding type inserter being adapted for inserting the terminal by holding the insulated wire of the terminal-connected wire by the pair of claws; an inserter selector for selecting a suitable inserter in conformity with the terminal-connected wire to be connected from the respective inserters; and a driver for driving the inserter selected by the inserter selector to insert the terminal.

With this construction, the terminal of the terminal-connected wire can be held by the terminal chuck and the held terminal can be inserted by the inserter in cooperation with the terminal chuck. There are prepared the terminal-push type inserter for directly pushing the terminal to insert the terminal in cooperation with the terminal chuck and the wire-holding type inserter for holding the insulated wire of the terminal-connected wire to insert the terminal in cooperation with the terminal chuck, and the inserter suitable for the terminal-connected wire to be inserted is selected and driven by the driver, thereby inserting the terminal in cooperation with the terminal chuck. Thus, the terminal inserting operation can be performed by commonly using the same terminal chuck and driver even at the production line along which many kinds of terminal-connected wires are conveyed.

A specific mode of the terminal chuck may be preferably such that the driving source is controlled to drive the pair of claws to reach an opened state where the claws are moved away from each other to hold the terminal, a clamping state where the claws rigidly hold the terminal, and a guiding state where the claws relatively displaceably guide the terminal. In such a case, upon causing the terminal to face the cavity of the connector housing, the pair of claws are brought to the clamping state to cause the leading end of the terminal to precisely face the entrance of the cavity. After the position of the terminal is completed, the state of the pair of claws is switched to the guiding state, whereby the insertion by the inserter can be easily and securely made.

The driver may be preferably provided with a measuring type judging device for judging whether the insertion of the terminal is proper or improper based on a pushing stroke of the inserter when the terminal-push type inserter is selected, and a pulling type judging device for judging whether the insertion of the terminal is proper or improper by pulling the insulate wire after the insertion when the wire-holding type inserter is selected.

Since there are provided the measuring type judging device for judging whether the insertion of the terminal by the terminal-push type inserter is proper or improper, and the pulling type judging device for judging whether the insertion of the terminal by the wire-holding type inserter is proper or improper, the insertion of the terminal can be checked by a suitable way regardless of which inserter is selected.

A specific mode of the measuring type judging device may be preferably such that a pushing force from the driver is transmitted to the terminal-push type inserter via an elastic member elastically deformable by a force smaller than a force for deforming the terminal and the terminal is further elastically pushed after being inserted to a specified insertion position to detect whether or not a degree of deformation of the elastic member lies within a specified range. In the case of adopting such a mode, the insertion of the terminal can be judged without exerting an excessive load onto the terminal. Therefore, even terminals having smaller diameters or dimensions can be safely and securely checked.

The driver may be preferably provided with a guiding surface for guiding the insulated wire to both claws of the wire-holding type inserter, and includes a guiding member for driving the pushing member of the selected terminal-push type inserter.

In this construction, the terminal-connected wire can be guided to the wire-holding type inserter by the guiding member and the pushing member of the terminal-push type inserter can be driven via this guiding member. Thus, the terminal-push type inserter can be driven around the longitudinal axis of the terminal-connected wire where these inserter are densely arranged without exerting any physical load onto the wire-holding type inserter.

It may be preferable to further provide a pushing-position switcher for switching the position on a radial direction of the terminal that the pushing member pushes the terminal.

In this construction, even if the posture of the terminal to be inserted into one of the cavities formed at a plurality of stages in the connector housing is inverted depending on at which stage this cavity is located, the terminal pushing position by the pushing member can be switched in conformity with the posture of the terminal.

This application is based on patent application No. 2002-348363 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An apparatus for connecting a terminal-connected wire, comprising:

a terminal chuck including a pair of claws for holding a terminal of a terminal-connected wire in which the terminal is connected with an end of an insulated wire beforehand, and a driving source for drivingly opening and closing the pair of claws;

a terminal-push type inserter including a pushing member for directly pushing the terminal, the terminal-push type inserter being adapted for inserting the terminal into a cavity of a connector housing by the pushing member;

a wire-holding type inserter including a pair of claws which are openable and closable to hold the insulated wire of the terminal-connected wire, the wire-holding type inserter being adapted for inserting the terminal into a cavity of a connector housing by holding the insulated wire of the terminal-connected wire by the pair of claws;

an inserter selector for selecting a suitable one from the inserters in conformity with the terminal-connected wire to be connected; and a driver for driving the inserter selected by the inserter selector to insert the terminal into a cavity of a connector housing.

2. The apparatus according to claim 1, wherein the driver includes a measuring type judging device for judging whether the insertion of the terminal is proper or improper based on a pushing stroke of the inserter when the terminal-push type inserter is selected, and a pulling type judging device for judging whether the insertion of the terminal is proper or improper by pulling the insulate wire after the insertion when the wire-holding type inserter is selected.

3. The apparatus according to claim 2, wherein the driver has a guiding surface for guiding the insulated wire to both claws of the wire-holding type inserter, and includes a guiding member for driving the pushing member of the selected terminal-push type inserter.

4. The apparatus according to claim 3, further comprising a pushing-position switcher for switching the position on a radial direction of the terminal that the pushing member pushes the terminal.

5. The apparatus according to claim 1, wherein the driver has a guiding surface for guiding the insulated wire to both claws of the wire-holding type inserter, and includes a guiding member for driving the pushing member of the selected terminal-push type inserter.

6. The apparatus according to claim 5, further comprising a pushing-position switcher for switching the position on a radial direction of the terminal that the pushing member pushes the terminal.

7. The apparatus according to claim 1, further comprising a pushing-position switcher for switching the position on a radial direction of the terminal that the pushing member pushes the terminal.

* * * * *